Oct. 31, 1944.   H. E. GILBERT   2,361,621
THREAD GAUGE
Filed Feb. 17, 1943   2 Sheets-Sheet 1

INVENTOR:
HOWARD E. GILBERT,
By John D. Rippey
HIS ATTORNEY.

Oct. 31, 1944.   H. E. GILBERT   2,361,621
THREAD GAUGE
Filed Feb. 17, 1943   2 Sheets-Sheet 2
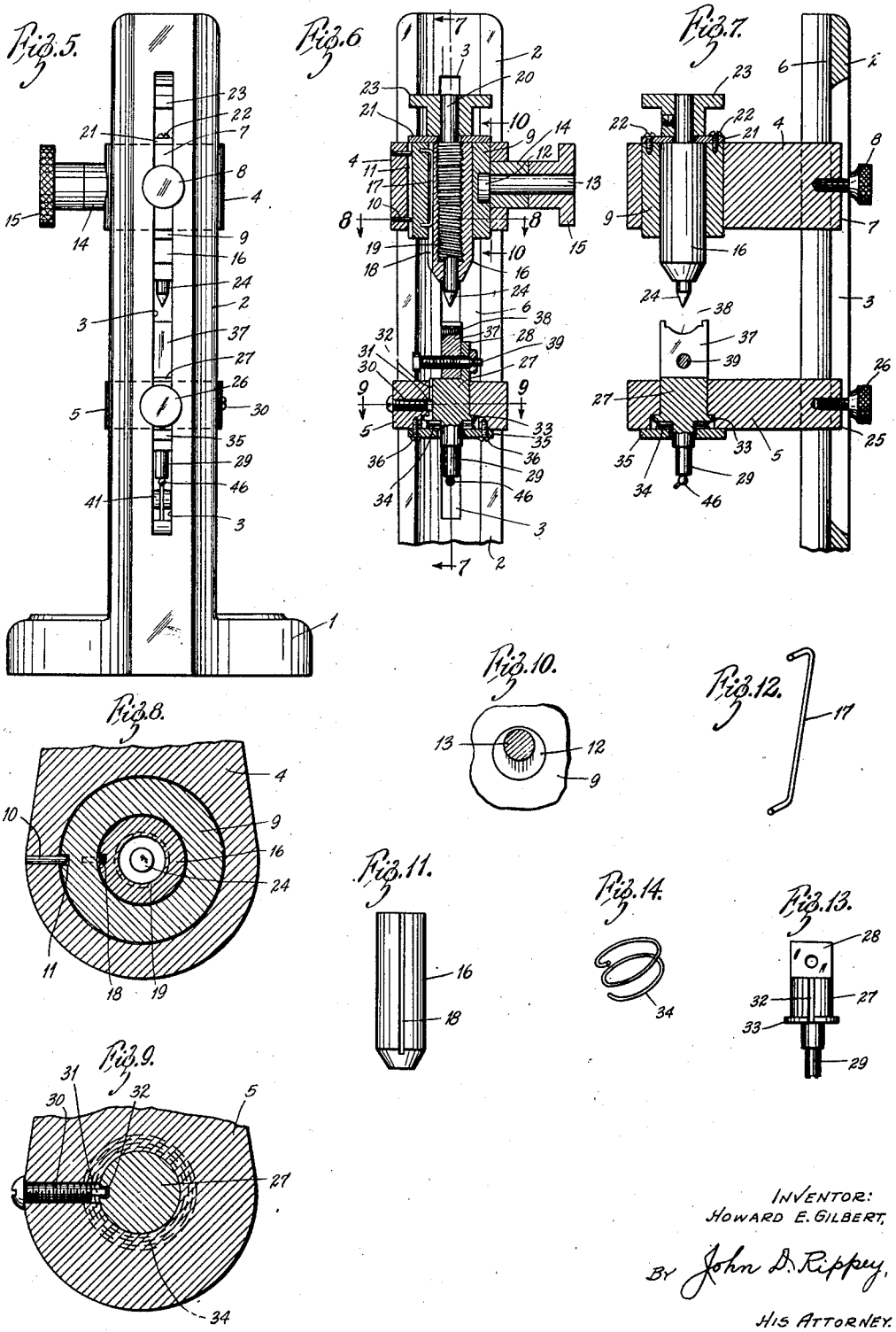
INVENTOR:
HOWARD E. GILBERT,
BY John D. Rippey,
HIS ATTORNEY.

Patented Oct. 31, 1944

2,361,621

UNITED STATES PATENT OFFICE 2,361,621

THREAD GAUGE

Howard E. Gilbert, University City, Mo., assignor to Lewis Lipman, St. Louis, Mo.

Application February 17, 1943, Serial No. 476,161

3 Claims. (Cl. 33—199)

This invention relates to thread gauges; and has special reference to gauges for determining and indicating whether screwthreads are sufficiently accurate and precise and are within the prescribed tolerances.

General objects of the invention are to provide a gauge device for determining and indicating whether external screwthreads have the required accuracy and precision and whether the screwthreads are symmetrical within the required tolerances, or are beyond the required tolerances because of asymmetrical formations; to provide a gauge device having spaced anvil and pointer elements which are relatively adjustable to positions conforming to a master member first engaged with said elements and then removed preparatory for subsequent engagement with said elements of the threaded member to be gauged; to provide threads upon the anvil whereby the screwthreaded article that is to be gauged will be moved longitudinally when said member is rotated about its axis; to provide means for yieldingly supporting one of said elements for movement when asymmetrical formations constituting irregularities or imperfections on or along the screwthreads engage either the anvil element or the pointer element and leaving the movable one of said elements free for movement complementary to said asymmetrical formations; and to provide mechanism under control of said movable element for visually indicating the fact of such movement and thereby visually indicating the existence and presence of asymmetrical formations constituting irregularities or imperfections on or along the screwthreads, and the amount or extent of such irregularities or imperfections.

A specific object of the invention is to provide a gauge device for determining and indicating whether screwthreads on different articles are accurate and precise enough for their intended purposes, and comprising a point element adapted to engage between the threads of a screwthreaded article, and a screwthreaded anvil element adapted to engage diametrically opposite portions of the screwthreads of said element; to provide means for yieldingly supporting and for actuating the anvil element when any asymmetrical formations constituting irregularities or imperfections on or along the screwthreads of the article being tested engage either said pointed element or said anvil element; and to provide means for visually indicating the movement of the anvil element by said asymmetrical formations constituting said irregularities or imperfections and thereby indicating their presence and existence.

Another object of the invention is to provide a gauge device for determining and indicating whether asymmetrical formations exist or are present on different forms and types of articles irrespective of whether such formations are on or along screwthreads or elsewhere on the articles that are tested, and irrespective of whether the articles are formed with screwthreads or not.

Other objects and advantages of the invention will be apparent from the following description, reference being made to the annexed drawings, in which—

Fig. 5 is a rear elevation of the thread gauge.

Fig. 6 is a vertical sectional view on the line 6—6 of Fig. 2.

Fig. 7 is a vertical sectional view on the line 7—7 of Fig. 6.

Fig. 8 is an enlarged cross-sectional view on the line 8—8 of Fig. 6.

Fig. 9 is an enlarged cross-sectional view on the line 9—9 of Fig. 6.

Fig. 10 is a sectional view on the line 10—10 of Fig. 6, showing the eccentric device for adjusting the pointer.

Fig. 11 is a side elevation of the internally threaded pointer sleeve apart from associated elements.

Fig. 12 is a perspective view of the feather or spline associated with the pointer sleeve.

Fig. 13 is a view showing the anvil support apart from the associated elements.

Fig. 14 is a perspective view of a coil spring used for supporting and actuating the anvil support.

Figure 1:
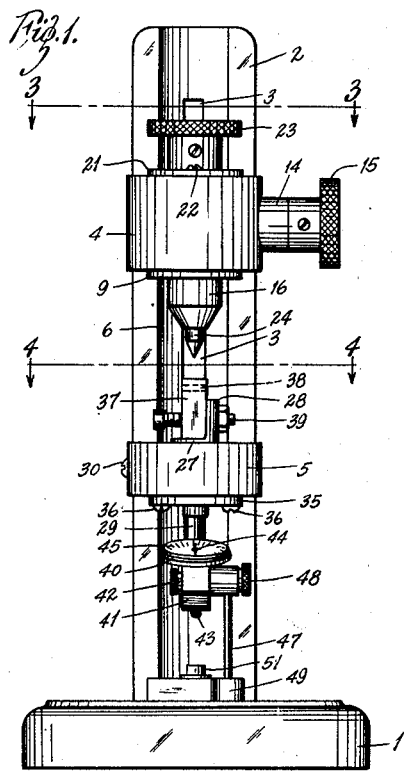
Fig. 1 is a front elevation of one embodiment of my improved thread gauge.
Figure 2:
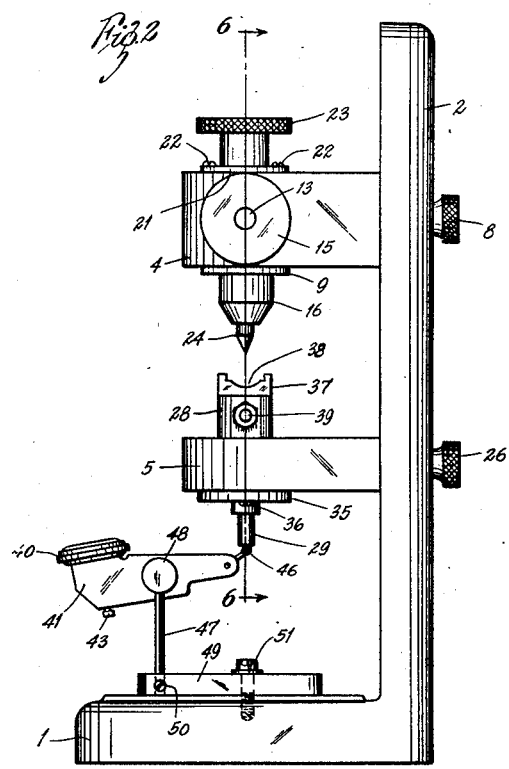
Fig. 2 is a side elevation.

My improved thread gauge device is of simplified construction and is easily portable. A preferred embodiment of one form of the invention comprises a portable supporting frame preferably of metal, including a base 1 adapted to seat upon a bench or other support, and a post 2 rigidly attached to one end of said base. In the arrangement shown, the post 2 is formed with a vertical slot 3 constituting a feature for attachment of the pointer support 4 and anvil support 5 to said post. The rear end of the pointer support 4 fits within a complementary groove 6 in the front side of the post 2, and has a tongue 7 projecting into the slot 3 and cooperating with the walls of said slot to guide the support 4 in its vertical movements, to prevent lateral displacement of said support 4, and to hold the support 4 properly alined with the support 5. A set screw 8 extends through the slot 3 and is screwed into a threaded hole in the tongue 7 and in the rear end of the support 4, and functions as a clamp to secure and hold the support 4 rigidly in any adjusted position along the post 2.

A bushing 9 is mounted for vertical sliding movements in an opening in the forward end of the support 4, and is held from turning about its vertical axis and guided in its vertical movements by keys or pins 10 engaging in a vertical groove 11 in the outer side of said bushing. The bushing 9 is supported and moved to its different vertical adjustments by an eccentric device 12 rigidly attached to the inner end of a stud 13 rotatively mounted in a bushing 14 which is secured in the outer end of the support 4. The stud 13 extends radially with respect to the axis of the bushing 9 and has a knob or handle 15 attached to its outer end whereby it may be rotated to move the bushing 9 to its different vertical adjustments. The stud 13 is frictionally mounted and thereby held against accidental turning and displacement. The bushing 9 may also be frictionally engaged in the support 4 and thereby held against any tendency toward displacement without positive operation of the eccentric crank device 12.

A pointer sleeve 16 is mounted coaxially in the bushing 9 for relative vertical sliding movements, and is held from turning relative to the bushing 9 by a key or spline 17 secured to said bushing and engaging in a longitudinal groove 18 in the sleeve. The interior of said sleeve 16 has screwthreads 19 with which a rotary threaded stem 20 is engaged. A plate 21 is detachably secured to the upper end of the bushing 9 by removable and replaceable fasteners 22 (Fig. 7), and has an opening through which the reduced upper end of the stem 20 extends. The threads on said stem form a shoulder abutting against the underside of said plate to prevent upward longitudinal movement of said stem while leaving said stem manually rotative. A knob or handle 23 is attached to the upper end of the stem 20 and constitutes manual means for rotating said stem to move the sleeve 16 longitudinally within and relative to the bushing 9 and prevents downward longitudinal movement of said stem. The bushing 9, sleeve 16, stem 20, and associated parts may be moved vertically as a unit to different adjusted positions by the eccentric device 12—13. A pointer element 24 is rigidly and detachably secured to the lower end of the sleeve 16 and projects downwardly in coaxial continuation of said sleeve.

The anvil support 5 also engages in the groove 6, and has a tongue 25 engaging in the slot 3 and cooperating with a clamping screw 26 to hold the support 5 rigidly in its different adjusted positions relative to the support 4 for the pointer element. The tongue 25 cooperates with the slot 3 and the set screw 26 to prevent any lateral displacement of said support 5. A movable anvil supporting member 27 having an upwardly extended arm 28, and a downwardly extended arm 29, is mounted for vertical sliding movements in the front end of the support 5. The anvil supporting member is guided in its vertical movements and held from rotation about its vertical axis by a removable and replaceable guide 30 having a pointer 31 at its inner end engaging in a vertical groove 32 in the member 27. The anvil supporting member has a circumferential flange 33 engageable against the underside of the support 5 to limit upward movement of said anvil supporting member and constituting a seat for a supporting and actuating spring 34. The spring 34 encircles the arm 29 and is mounted on a plate 35 detachably secured to the support 5 by removable and replaceable fasteners 36.

When the gauge is to be used for gauging external screwthreads, an anvil 37 having an arcuate screwthreaded notch 38 in its upper end is detachably secured to the arm 28 by a removable and replaceable fastener 39. The notch 38 curves in conformity with the radius of the screwthreaded element to be tested. The screwthreads within said notch are perfectly formed so that, when any asymmetrical formations constituting irregularities or imperfections on or along the screwthreads of the article engage the screwthreads in the notch 38 or engage the pointer 24, the presence and existence of such asymmetrical irregularities or imperfections will be indicated as hereinafter described.

A micrometer indicator device 40 is supported for control by the anvil for visually indicating the presence and existence of asymmetrical irregularities or imperfections on or along the screwthreads being tested, and thereby visually indicating whether the screwthreads are within the required and prescribed tolerances. The indicator device 40 is detachably secured to an arm 41 by set screws 42 and 43 (Fig. 1) in a manner unimportant to the present invention. For present purposes, it is sufficient to understand that the pointer 44 of the micrometer indicator device is movable in opposite directions from and to an initial or starting position, such as the position 45 in order to indicate the presence and existence of irregularities or imperfections on or along the screwthreads being tested in response to movement of the anvil 37. A lever 46 pivotally supported by the arm 41 is connected in some appropriate and known manner with the pointer 44 so that downward movement of said lever 46 will move the pointer 44 in one direction from said initial or starting position 45, and upward movement of said lever 46 will move said pointer 44 in the opposite direction from said position 45. A support for the indicator device is provided so that it will operate or be operated in response to the movement of the anvil 37 and its support in conformity with asymmetrical formations on the article being tested. The arm 41 is detachably mounted on the upper end of a post 47 to which it may be secured by a clamping set screw 48. When the clamping set screw 48 is set or clamped against the post 47, the arm 41 and post 47 are rigidly connected and held against relative movement or displacement; and, when the set screw 48 is loosened, the arm 41 and post 47 may be detached or separated. The lower end of the post 47 is detachably connected with a base 49 seated upon the base 1 by a set screw 50; and the base 49 may be rigidly secured to the base 1 in any adjusted position by a fastener 51. The fastener 51 is in axial alinement with the anvil support so that the base 49 may be secured to the base in any angular position about the axis of said fastener 51, and in all such positions will hold the end of the lever 46 in alinement with and against the lower end of the arm 29 of the anvil support.

Figure 15:
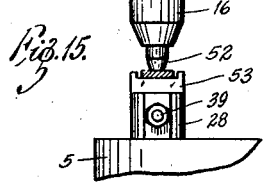
Fig. 15 is a view showing pointer and anvil elements for testing solid articles for asymmetrical surface formations and without screwthreads.

The device may be used as well in gauging different articles having different respective diameters or different respective thicknesses to determine and indicate visually whether any of said articles have asymmetrical irregularities and imperfections, irrespective of whether any of said articles are provided with screwthreads or not. For instance, as shown in Fig. 15, a pointer element 52 may be substituted for the pointer element 24 to engage one side or surface of an article. An anvil element 53 may be substituted for the anvil element 37. The pointer element 52 and the anvil element 53 have their lower and upper ends formed in conformity with the surfaces of an article to be gauged and which is without screwthreads along the said surfaces. By inserting and moving the article to be gauged into and through the space between the pointer and anvil elements, the said anvil element will move or will be moved in conformity with any asymmetrical formations on said article that engage the pointer element 52 or the anvil element 53. The article being gauged may be moved between the pointer and anvil elements manually or otherwise and, in this instance, does not depend upon interengaging screwthreads to effect such movement automatically and as an incident to rotation of said article.

Figure 3:
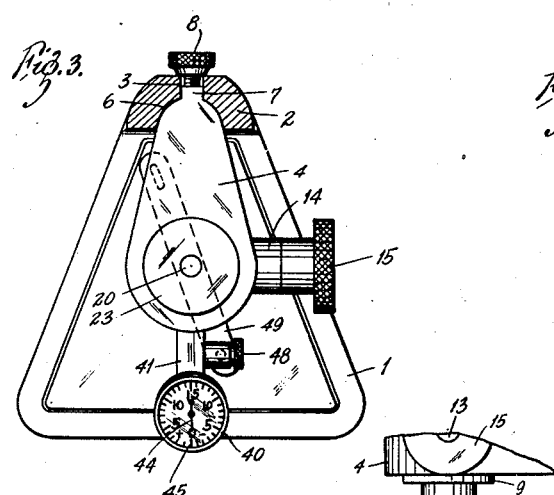
Fig. 3 is a sectional view on the line 3—3 of Fig. 1.
Figure 4:
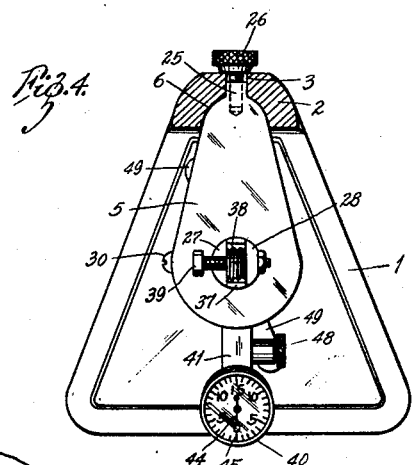
Fig. 4 is a cross-sectional view on the line 4—4 of Fig. 1, showing the upper end of the threaded anvil and also showing the indicator controlled thereby.

The device may be adjusted for use in gauging articles of any type for which it is designed and adapted after the supports 4 and 5 are in proper relative positions on the post 2. In effecting proper adjustment the handle or knob 15 is turned to and maintained in position in which the eccentric 12 extends downwardly and holds the bushing 9 in its lowermost adjustment. When the device is to be used for gauging unthreaded articles for diameters and thicknesses, a perfect master or datum member (not shown) having the same diameter or the same thickness as the articles to be tested, is extended between the pointer element 52 and the anvil element 53. The handle or knob 23 is then operated to move the sleeve 16 longitudinally of its axis to engage the pointer element 52 with the master or datum member and thereby operate the indicator pointer 44 to a selected initial or starting datum position 45. The master or datum member is then removed and the articles to be tested are moved through the space between the pointer element and anvil element. To test screwthreads for asymmetrical formations, a master datum member provided with perfect screwthreads is placed between a pointer element 24 and an anvil element 37. The screwthreaded master datum element is then removed and the screwthreaded articles to be tested are moved through the space between the pointer element and the anvil element. In either instance, so long as the indicator pointer 24 remains at the initial or starting position 45 while the articles being tested are between the pointer and anvil elements, no asymmetrical irregularities or imperfections have been brought into engagement with the pointer element or the anvil element. When any such asymmetrical irregularities or imperfections on or along the articles being tested encounter either the pointer element or the anvil element, said anvil element is moved and such movement is imparted to the indicator pointer 44, which is thereby moved in one direction or the other from the initial starting position 45 which is the datum position. The arrangement is such that, when protruding asymmetrical irregularities or imperfections on or along the articles being tested encounter either of the pointers 24 or 52, or either of the anvils 37 or 53, the anvil will be moved downwardly in opposition to the spring 34, the lever 46 will be moved downwardly thereby, and the pointer 44 of the indicator device will be moved in a clockwise direction (Figs. 3 and 4) to indicate the presence or existence of such protruding asymmetrical irregularities or imperfections on or along the article being tested.

When indentations that constitute asymmetrical irregularities or imperfections on or along any article being tested engage either the pointer 24 or the pointer 52, or engage either the anvil 37 or the anvil 53, said anvil will be moved upwardly a slight distance by the spring 34. This permits the lever 46 to move upwardly in accompaniment with said anvil and enables the usual spring (not shown) of the indicator device to move the indicator pointer 44 in a counter-clockwise direction from the datum starting position 45. This visually indicates the presence or existence of such asymmetrical indentations as constitute irregularties or imperfections on or along the articles being tested.

As explained, the pointer elements 24 and anvil elements 37 are removable, replaceable and interchangeable. They may be removed, and replaced and interchanged by pointer elements 52 and anvil elements 53, or others. Anvil elements 37 having curved notches 38 formed, respectively, on different radii of curvature and having screwthreads of different formation and pitch, may be substituted one for the other, as may the pointer elements 24. In these ways, my improved gauge may be modified and adapted for use in testing articles for thicknesses and widths, as well as for testing screwthreads on articles of different respective diameters and screwthreads of different respective formations and pitch. So, also, the device may be used for gauging articles of different respective shapes, different respective thicknesses, and different respective diameters.

From the foregoing, it should be apparent that this invention attains all of its intended objects and purposes with a high degree of efficiency, and may be easily adapted for use in testing various types and sizes of threaded articles. The form of the device and the construction and arrangement of the parts embodied therein, may be changed and varied within the scope of equivalent limits without departure from the nature and principle of the invention.

I claim:

1. A gauge device for testing and determining whether screwthreads are accurate or whether said screwthreads have asymmetrical formations, comprising a supporting frame, a longitudinally adjustable sleeve mounted in said frame, a device for moving said sleeve longitudinally in opposite directions to selected positions, a pointer supported by said sleeve, means for moving said pointer longitudinally to selected adjusted positions relative to said sleeve for engaging between the screwthreads to be tested, an anvil having a screwthread for engaging the screwthreads to be tested and cooperating with said pointer to move the screwthreaded article longitudinally when said article is rotated between said anvil and said pointer, a spring device for supporting said anvil for movements longitudinally of the axis of said pointer when asymmetrical formations on the screwthreads being tested engage either said pointer or said anvil, means preventing said anvil from turning and leaving the same free for said movements, an indicator device, and means for supporting said indicator device in position for operation under control of said anvil to indicate when said anvil is moved as aforesaid.

2. A gauge device for testing and determining whether screwthreads are within or are beyond the limits of required tolerances, comprising a supporting frame, separate pointer and anvil supports, means for guiding said pointer and anvil supports to different relative positions along said frame and for holding said supports in said positions, a sleeve in said pointer support, means for moving said sleeve to different adjusted positions in said pointer support, a pointer carried by said sleeve, means for moving said pointer to different adjusted positions relative to said sleeve, an anvil separated from said pointer by an intervening space, a spring for supporting said anvil for movements longitudinally of the axis of said pointer when asymmetrical formations on the screwthreads being tested engage either said pointer or said anvil, and an indicator device supported by said frame and controlled by said anvil for visually indicating when said anvil is moved as aforesaid.

3. A gauge device for testing solid articles for asymmetrical surface formations, comprising axially alined pointer and anvil elements separated by an intervening space to receive articles to be tested, a support, a bushing mounted for axial movements in said support, devices for moving said bushing axially to different adjusted positions in said support and holding said bushing from turning, a sleeve mounted for axial movements in said bushing and supporting one of said elements, means for moving said sleeve axially relative to said bushing to different adjusted positions and for holding said sleeve rigid and immovable, a guide supporting the other of said elements for axial movement toward and from said rigid and immovable element, a spring carried by said guide and actuating said other element toward said rigid and immovable element and leaving said other element movable when an asymmetrical formation on any article in said space engages either of said elements, a micrometer indicator mechanism, a detachable support for said entire indicator mechanism, and means for securing said support in a position in which said indicator mechanism is controlled by said other element to indicate visually when any movement of said other element occurs.

HOWARD E. GILBERT.